United States Patent
Ylitalo et al.

(10) Patent No.: US 6,730,714 B2
(45) Date of Patent: May 4, 2004

(54) INKS AND OTHER COMPOSITIONS INCORPORATING LIMITED QUANTITIES OF SOLVENT ADVANTAGEOUSLY USED IN INK JETTING APPLICATIONS

(75) Inventors: Caroline M. Ylitalo, Stillwater, MN (US); Richard L. Severance, Stillwater, MN (US); Ronald K. Thery, New Brighton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/293,065

(22) Filed: Nov. 13, 2002

(65) Prior Publication Data

US 2003/0158283 A1 Aug. 21, 2003

Related U.S. Application Data

(62) Division of application No. 09/711,345, filed on Nov. 9, 2000, now Pat. No. 6,558,753.

(51) Int. Cl.[7] .............................. C08K 5/04; C08K 5/10; C09D 11/10
(52) U.S. Cl. .............................. 522/74; 522/75; 522/79; 522/80; 522/84; 522/96; 522/97; 106/31.57; 106/31.58; 524/356; 524/366; 524/379
(58) Field of Search ........................... 106/31.57, 31.58; 522/74, 75, 79, 80, 83, 84, 96, 97; 347/101, 102; 427/466; 524/356, 366, 379

(56) References Cited

U.S. PATENT DOCUMENTS

| | | | |
|---|---|---|---|
| 3,953,214 A | 4/1976 | Lipson | |
| 4,228,438 A | 10/1980 | Vazirani | |
| 4,303,924 A | 12/1981 | Young, Jr. | |
| 4,978,969 A | 12/1990 | Chieng | |
| 5,156,675 A | 10/1992 | Breton et al. | |
| 5,165,968 A | * 11/1992 | Johnson et al. | ............. 427/288 |
| 5,376,169 A | 12/1994 | Hotomi et al. | |
| 5,641,346 A | 6/1997 | Mantell et al. | |
| 5,663,217 A | * 9/1997 | Kruse | .................... 523/161 |
| 5,703,141 A | 12/1997 | Jin | |
| 5,876,492 A | 3/1999 | Malhotra et al. | |
| 5,981,113 A | 11/1999 | Christian | |
| H1828 H | 1/2000 | Wong et al. | |
| 6,113,679 A | * 9/2000 | Adkins et al. | ............. 106/31.6 |
| 6,294,592 B1 | 9/2001 | Herrmann et al. | |
| 6,310,115 B1 | 10/2001 | Vanmaele et al. | |
| 6,534,128 B1 | * 3/2003 | Carlson et al. | ............. 427/466 |
| 2002/0086914 A1 | * 7/2002 | Lee et al. | ..................... 522/75 |

FOREIGN PATENT DOCUMENTS

| | | |
|---|---|---|
| EP | 0 407 054 A1 | 1/1991 |
| EP | 0 187 045 B1 | 7/1991 |
| EP | 0 590 889 A2 | 4/1994 |
| EP | 0 465 039 B1 | 1/1995 |
| EP | 0 658 607 A1 | 6/1995 |
| EP | 0 882 104 B1 | 10/1999 |
| EP | 0 842 051 B1 | 2/2000 |
| EP | 0 659 039 B1 | 3/2000 |
| EP | 0 997 508 A1 | 5/2000 |
| JP | 60132767 | 7/1985 |
| JP | 63235382 | 9/1988 |
| JP | 1133746 | 5/1989 |
| JP | 2283452 | 11/1990 |
| JP | 2311569 | 12/1990 |
| JP | 3216379 | 9/1991 |
| JP | 50 09259 A | 1/1993 |
| JP | 53 20287 A | 12/1993 |
| WO | WO 89/07878 | 8/1989 |
| WO | WO 91/17302 | 11/1991 |
| WO | WO 97/31071 | 8/1997 |
| WO | WO 98/16590 | 4/1998 |
| WO | WO 98/55900 | 12/1998 |
| WO | WO 99/06888 | 2/1999 |
| WO | WO 99/19900 | 4/1999 |
| WO | WO 99/29787 | 6/1999 |
| WO | WO 99/54416 | 10/1999 |

* cited by examiner

Primary Examiner—Susan Berman

(57) ABSTRACT

Radiation curable inks with moderate amounts of solvent with low surface tension provide unique processability characteristics that allow ink jetted features to be formed and cured with excellent flow, adhesion, dot gain, compatibility, weatherability, and curing characteristics. In a representative printing method, an ink jettable ink composition is provided that includes one or more oligo/resins, a radiation curable, reactive diluent having a surface tension and 1 to 15 weight percent of a solvent component comprising a solvent having a surface tension. The solvent surface tension is no more than about, and preferably at least 2 dynes/cm less than, the surface tension of the reactive diluent. The ink composition is ink jetted onto the substrate to form an ink jetted feature. While at least a portion of the solvent is still present in the ink jetted feature, the ink jetted feature is exposed to an amount of curing energy under conditions effective to at least substantially cure the radiation curable component of the printed feature and to at least substantially dry the ink jetted feature.

12 Claims, No Drawings

INKS AND OTHER COMPOSITIONS INCORPORATING LIMITED QUANTITIES OF SOLVENT ADVANTAGEOUSLY USED IN INK JETTING APPLICATIONS

CROSS REFERENCE TO RELATED APPLICATION

This application is a divisional of U.S. application Ser. No. 09/711,345, filed Nov. 9, 2000, now U.S. Pat. No. 6,558,753, the disclosure of which is herein incorporated by reference.

FIELD OF THE INVENTION

The present invention relates to low viscosity, ink jettable, radiation curable compositions incorporating limited quantities of solvent to provide the compositions with viscosity, wettability, compatibility, and rapid curing advantages. The compositions generally include a radiation curable component (containing one or more radiation curable monomers, macromers, oligomers, and/or polymers), a solvent, and optional additives such as colorants, photoinitiators, and the like. The compositions are particularly well-suited for forming ink jetted, radiation cured printed features on substrates such as signs, walkways, roadways, motor vehicles, boats, aircraft, furniture, equipment, and the like. The compositions are particularly well-suited for use in outdoor applications.

BACKGROUND OF THE INVENTION

Inkjet imaging techniques have become very popular in commercial and consumer applications. Ink jet printers operate by ejecting ink onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers are capable of forming printed features on a wide variety of substrates, as well as three-dimensional objects in applications such as rapid prototyping.

Thermal ink jet printers and piezo inkjet printers are the two main types of ink jet systems in widespread use today. For both approaches, inks must meet stringent performance requirements in order for the inks to be appropriately jettable and for the resultant printed features to have the desired mechanical, chemical, visual, and durability characteristics. In particular, inks must have relatively low viscosity when jetted, yet must be able to form accurate, durable images on the desired receiving substrate. For example, a typical ink for thermal ink jetting must typically have a viscosity in the range of 3 to 5 centipoise at 25° C., while piezo inks must typically have a viscosity in the range of 3 to 30 centipoise at the jetting temperature. The need to use low viscosity inks makes it challenging to obtain printed features with good mechanical, chemical, visual, and durability characteristics.

Solvent-based and water-based jettable inks are well known. A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Water-based inks have drawbacks. For industrial applications, drying is energy and equipment intensive. Drying water also takes time, and the printed material needs to be handled carefully during the relatively lengthy drying period. Water-based inks are also compatible only with a limited range of substrates, typically those on which the water is absorbed to some degree. Images formed using water-based inks typically require a protective overlaminate for outdoor applications.

Instead of water, other solvent-based inks include relatively volatile, inorganic solvents. Such inks dry more rapidly and easily than aqueous inks. However, such solvents may be toxic, flammable, or the like, requiring careful handling. These inks also tend to be compatible with only a limited range of substrates.

In order to avoid using a conventional solvent, ink compositions incorporating a free radically polymerizable diluent have been developed. The diluent not only functions as a solvent, but also functions as a viscosity reducer, as a binder when cured, and optionally as a crosslinking agent. In the uncured state, these compositions have a low viscosity and are readily jetted. However, the polymerizable monomers readily crosslink upon exposure to a suitable source of curing energy, e.g., ultraviolet light, electron beam energy, and/or the like, to form a crosslinked polymer network. Depending upon the kind of monomers incorporated into the diluent, the resultant network may provide the printed features with durability, flexibility, elasticity, gloss, hardness, chemical resistance, stiffness, combinations of these, and the like.

There are many instances in which relatively large amounts of solvent have been incorporated into radiation curable ink compositions. For example, EP 407,054 (1990) and U.S. Pat. No. 4,978,969 each describe radiation curable ink jet inks containing 10 to 40 weight percent of solvent. JP 9-314981 (1997) describes ink jet inks containing greater than 40 weight percent of methyl ethyl ketone (MEK) solvent. U.S. Pat. No. 5,623,001 describes radiation curable ink jet inks containing 20 to 75 weight percent water. The use of ink compositions containing relatively large amounts of solvent that might require separate drying steps is desirably avoided.

There are other instances in which relatively little if any solvent has been incorporated into radiation curable ink compositions. For example, EP 540,203 (1993) and U.S. Pat. No. 5,275,646 describe radiation curable compositions with no solvent. JP 9-183929 (1997) and WO 98/27171 also describe solvent-free compositions. WO 99/29787 and 99/29788 both describe radiation curable ink jet inks containing less than 1% solvent.

WO 97/31071 (corresponding to U.S. Pat. No. 6,114,406) also describes ink jet inks with limited solvent content. The document generically suggests that the inks may contain up to about 10 weight percent solvent, but the examples only describe ink formulations that do not include any solvent. The compositions also must include major amounts of alkoxylated or polyalkoxylated material, but unfortunately such compositions tend to have poor weatherability, adhesion, and compatibility characteristics due to the high alkoxylated content in the main chain(s) of the resultant cured matrix.

Substrate compatibility is an important characteristic of radiation curable compositions, particularly for industrial or signage applications in which printed features may be formed upon a wide variety of different substrate materials. However, many radiation curable compositions show good wettability and adhesion to only a limited range of substrates, requiring maintenance of several different kinds of inks in those environments in which a wide variety of substrates are likely to be encountered. Many radiation curable ink compositions, particularly those incorporating significant quantities of main-chain alkoxylated or polyalkoxylated functionality, also suffer from poor weatherability in outdoor applications. It would be desirable to provide ink jet inks that are compatible with a wide range of different porous and nonporous substrates.

Rapid curing of radiation curable compositions is highly desirable to increase production capacity and throughput. However, oxygen in the ambient can have a tendency to inhibit free radical polymerization reactions. While oxygen inhibition can be avoided by curing materials in an inert atmosphere, maintaining an inert atmosphere during cure involves extra equipment and expense. Curing in an inert atmosphere also may not be practical in some applications. Accordingly, it would be highly desirable to provide ink jet inks that cure rapidly in the ambient and for which the risk of oxygen inhibition in the ambient is significantly reduced. It would be even more desirable if such curing could be carried out without resort to an inert atmosphere.

Ink jet compositions also require good dot gain characteristics. Dot gain refers to the degree to which an ink jetted drop spreads out upon application to a substrate. If an ink jetted drop spreads out too much on the substrate, then poor edge definition and intercolor bleed is observed. On the other hand, if an ink jetted drop spreads insufficiently upon application to the substrate, then poor color density is likely to result. Dot gain characteristics depend upon factors including the nature of the ink jet composition, substrate temperature, interfacial tension between the ink and the substrate, and the nature of the substrate. Some inks show favorable dot gain characteristics on some substrates, but not on others. It would be desirable to provide ink compositions that have consistently good dot gain characteristics with a wide variety of different porous and nonporous substrates.

Typically, to improve wetting and dot gain, the surface tension of an ink is lowered by adding flow agents. Flow agents are present at relatively low concentrations. A typical ink formulation, for example, includes up to 0.1 to about 1 weight percent of one or more flow agents. Commonly used flow agents are either silicone or fluorine based. Both classes of flow agents have drawbacks. Silicone based flow agents may have a tendency to reduce adhesion of the ink to the substrate. Fluorine based flow agents are becoming subject to increasingly stringent environmental regulations and restrictions. Even when added in such small amounts, flow agents in general may cause too large a decrease in surface tension, resulting in meniscus instability at the ink jet nozzle. Meniscus instability can cause poor ink reliability, flooding of the nozzle plate, and raises the need for frequent priming of the printhead. Therefore, although appropriate surface tension properties are required for good printing performance, it would be desirable to achieve such properties without including flow agents in ink formulations.

SUMMARY OF THE INVENTION

The present invention is based, in part, upon the discovery that radiation curable inks with moderate amounts of a low surface tension (and preferably volatile) solvent component provide unique processability characteristics that allow ink jetted features to be formed and cured with excellent flow, adhesion, dot gain, compatibility, weatherability, and curing characteristics. The presence of some solvent in the compositions promotes wettability and compatibility with many different substrate materials. Indeed, in preferred embodiments, selecting a solvent that penetrates into the substrate helps promote interaction, and hence adhesion, between the substrate and the ink. The use of some solvent also results in a dramatic decrease in composition viscosity. This expands the range and content of monomers, macromers, oligomers, and/or polymers that can be incorporated into inks while still retaining ink jettable viscosity characteristics. By selecting solvents with low surface tension, the overall surface tension of the ink is reduced, eliminating the need for separate flow agents. In effect, the solvent with low surface tension properties performs a double function as both solvent and flow agent.

Yet, by using a limited amount of solvent, the solvent is easily removed to provide dry, ink jetted features. In preferred embodiments, the ink jetted features can be dried using only the heat generated during radiation curing so that at least major portions of drying and curing can occur substantially in the same step. In short, wet, ink jetted features can be radiation cured and dried at the same time.

Faster radiation curing also occurs when the inks include a moderate amount of solvent. While not wishing to be bound by theory, the faster radiation cure rate is believe to be due, at least in part, to the presence of the evaporating solvent. The solvent vapors generated by the heat of curing are believed to form a barrier over the printed features. This barrier prevents ambient oxygen from easily reaching the surface of the curing features, where the oxygen might otherwise inhibit free radical polymerization. In practical effect, a protective barrier advantageously is generated over the features in situ as the cure occurs. Due to the enhancement of the cure rate and the elimination of a need for a separate drying step, production speeds of over 1000 $ft^2$/hr can be achieved when using inks of the present invention.

Additionally, reducing or preventing oxygen inhibition of the free radically cured ink produces images with cured surfaces that cure better and are tack free if desired.

In one aspect, the present invention relates to a method of making an ink jettable fluid composition. According to the method, a solvent component to incorporate into the composition is selected, wherein the solvent component comprises a solvent having a surface tension and wherein the solvent is selected for incorporation into the composition from information comprising a solvent characteristic indicative of the solvent surface tension. Once selected, from about 1 to about 15 weight percent of the solvent is incorporated into a composition comprising said solvent and a radiation curable, reactive diluent having a surface tension, wherein the surface tension of the solvent is no more than about, and preferably at least about 2 dynes/cm less than, the surface tension of the radiation curable reactive diluent. The composition also comprised one or more oligo/resins. Thereby, the ink jettable fluid composition is formed.

In another aspect, the present invention relates to a method of printing. An ink jettable ink composition is provided that includes one or more oligo/resins, a radiation curable, reactive diluent having a surface tension, and 1 to 15 weight percent of a solvent component comprising a solvent having a surface tension. The solvent surface tension is no more than about, and preferably at least about 2 dynes/cm less than, the surface tension of the reactive diluent. The ink composition is jetted onto the substrate to form an ink jetted feature. While at least a portion of the solvent is still present in the ink jetted feature, the ink jetted feature is exposed to an amount of curing energy under conditions effective to at least substantially cure the radiation curable component of the printed feature and to at least substantially dry the ink jetted feature.

In another aspect, the present invention relates to a jettable ink composition. The composition includes one or more oligo/resins, a radiation curable component comprising a radiation curable, reactive diluent having a surface tension; from about 1 to about 15 weight percent of a solvent having a surface tension, wherein the solvent surface tension is no more than about, and preferably at least about 2 dynes/cm less than, the surface tension of the reactive diluent surface tension; and an amount of a colorant effective to provide the ink when cured with a visually discernable optical characteristic.

In another aspect, the present invention relates to a jettable ink composition, comprising one or more oligo/resins; a radiation curable component; about 0.5 to about 20 weight percent of an ester solvent comprising a branched aliphatic moiety, said ester solvent having a surface tension less than about 30 dynes/cm; and an amount of a colorant effective to provide the ink when cured with a visually discernable optical characteristic.

In another aspect, the present invention relates to a jettable composition, comprising one or more oligo/resins; a radiation curable component comprising no more than about 30 weight percent of alkoxylated or polyalkoxylated ingredients; about 0.5 to about 15 weight percent of a solvent having a surface tension of less than 30 dynes/cm; and an amount of a colorant effective to provide the ink with a visually discernable optical characteristic.

In another aspect, the present invention relates to a jettable ink composition comprising a solvent having a surface tension of less than about 30 dynes/cm and a flash point of at least 50° C., said composition being at least substantially free of flow control agents comprising fluorinated and/or silicone moieties.

Preferred embodiments of one or more aspects of the present invention may include one or more of several desirable features of which the following list is representative:

the surface tension of the solvent is less than about 30 dynes/cm;

the solvent is nonpolar;

the composition is at least substantially free of flow control agents comprising silicone and/or fluorinated moieties;

the solvent is an acetate ester;

the composition is substantially nonconductive;

the solvent has a flash point of at least 50° C.;

the composition comprises 1 to 10 weight percent of the solvent;

the solvent is an ester comprising a branched aliphatic moiety including 4 to 20 carbon atoms;

the branched aliphatic moiety is a branched alkyl moiety, e.g., an isoalkyl moiety; and/or the solvent is at least substantially free of radiation-curable moieties.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Durable, weather resistant, features such as text, bar codes, graphics, images and/or other indicia may be formed on one or more receiving substrates in one or more desired patterns by applying and then curing fluid composition(s) of the present invention. Preferred embodiments of the present invention are in the form of colored inks or protective clearcoat inks.

Prior to curing, fluid compositions of the present invention preferably have one or more of several desirable features. Firstly, radiation curable compositions of the present invention tend to have sufficiently low viscosity properties so that the fluid compositions advantageously may be applied to receiving substrates using ink jetting techniques. Preferably, fluid compositions of the present invention have a viscosity of below about 30 centipoise, preferably below about 25 centipoise, and more preferably below about 20 centipoise at the desired ink jetting temperature (typically from ambient temperature up to about 65° C.). However, the optimum viscosity characteristics for a particular composition will depend upon the jetting temperature and the type of ink jet system that will be used to apply the composition onto the substrate. For example, for piezo ink jet applications, a typical desired viscosity is about 3 to about 30 centipoise at the print head temperature. Generally, this means that the fluid compositions preferably have a viscosity at 25° C. of up to about 50 centipoise. Particularly preferred embodiments of the fluid compositions described herein tend to have viscosities in the range of 10 to 16 centipoise at moderate temperatures of 25° C. to about 65° C.

Such viscosity characteristics generally help to ensure that the composition will be jettable at the desired print head temperature. Due to potential volatility and reactivity of one or more constituents of radiation curable compositions, the fluid compositions preferably are jetted at temperatures no higher than about 65° C., and more preferably no higher than about 50° C.

As another preferred characteristic that is desirable for ink jetting applications, fluid compositions of the present invention desirably have moderate to low surface tension properties. Preferred formulations have a surface tension in the range of from about 20 dynes/cm to about 50 dynes/cm, more preferably in the range of from about 22 dynes/cm to about 40 dynes/cm at the printhead operating temperature. Most radiation curable, monomeric constituents (hereinafter referred to as the "reactive diluent") to be incorporated into the radiation curable component of the present invention, as well as the preferred solvents discussed below, already have surface tension characteristics in the preferred ranges. Therefore, formulating fluid compositions of the present invention with appropriate surface tension characteristics for ink jet applications is easily accomplished.

Preferred fluid compositions of the present invention also have Newtonian or substantially Newtonian viscosity properties. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta = m\gamma^{n-1}$$

wherein $\eta$ is the shear viscosity, $\gamma$ is the shear rate in $s^{-1}$ m is a constant, and n is the power law index. The principles of the power law index are further described in C. W. Macosko, "Rheology: Principles, Measurements, and Applications", ISBN #1-56081-579-5, page 85.

Newtonian or substantially Newtonian fluid compositions are especially preferred over non-Newtonian fluids that exhibit substantial shear thinning behavior. Typically, substantially shear thinning fluids are elastic. Elasticity of a fluid tends to cause extension thickening behavior, which is known to prevent jetting of inks even when the low viscosity requirement is satisfied. Another reason for using fluids with at least substantially Newtonian viscosity properties is that jetting is typically achieved at shear rates around $1 \times 10^6$ s$^{-1}$, while ink refill from the reservoir into the ink jet head channels takes place at 100–1000 s$^{-1}$. A highly shear thinning ink will have much higher viscosity at the refill rate than at the jetting rate. This tends to slow down refill, compromising printhead performance. Shear thinning fluids can be avoided by formulating fluid compositions that exhibit little or no elasticity at the jetting temperature. Elasticity is minimized by controlling the amount and weight average molecular weight of oligo/resins incorporated into the fluid composition, by selecting highly branched oligo/resins, and/or by manipulating the solubility of the higher molecular weight species in the formulation. Generally, formulations in which the oligo/resins are more soluble tend to be more elastic than ones in which the oligo/resins are less soluble.

Compositions of the present invention also preferably have one or more of several desirable features when cured. Firstly, preferred embodiments of the present invention are compatible with an extremely wide variety of porous and nonporous substrates. This is due, at least in part, to the combinations of oligo/resin constituent(s) (for example, oligomers and/or polymers), monomer(s) of the reactive diluent and solvent(s). The radiation curable fluid compositions also exhibit good adhesion to non-porous substrates, especially those used in retroreflective sheeting topfilms, when measured according to ASTM D 3359-95A Standard Test Methods for Measuring Adhesion by Tape Test, Method B.

Cured compositions of the present invention may have a wide range of elongation characteristics depending upon the intended use. For example, such compositions may be characterized by an elongation of at least about 1%, preferably at least about 20%, more preferably from more than about 50% to about 300% or more, as desired. Cured compositions with elongation characteristics greater than about 50% are beneficially used to reduce stress cracks, improve toughness, and improve weatherability. In the practice of the present invention, elongation of a cured material refers to the maximum elongation at break determined in accordance with ASTM Test Method D-3759.

Cured compositions of the present invention also desirably are characterized by an elongation of at least about 50%, preferably at least about 100%, more preferably from more than about 100% to about 300%. Advantageously, cured compositions with such elongation characteristics are extremely beneficial in order to prevent the cured ink layer from delaminating due to stretching or other dimensional change of the underlying substrate. Such elongation also allows the cured inks to more easily conform to contoured surfaces, such as the contours and rivets on the panels of trucks or other vehicles.

Many embodiments of the radiation cured fluids of the present invention, excepting any containing opaque colorants such as carbon black, titania (TiO$_2$), or organic black dye, are transparent when measured according to ASTM 810 Standard Test Method for Coefficient of Retroreflection of Retroreflective Sheeting. That is, when coated onto retroreflective substrates, the visible light striking the surface of such films is transmitted through to the retroreflective sheeting components. This property makes such inks particularly useful for outdoor signing applications, in particular traffic control signing systems. The radiation cured films of these liquid formulations are formulated and cured under conditions so as to exhibit tack-free surfaces when cured. This makes the printed images resistant to dirt build-up and the like.

In preferred embodiments, the cured films also resist marring when subjected to moderate abrasion. A useful method for evaluating abrasion resistance is ASTM D 4060 Standard Test Method for Abrasion Resistance of Organic Coatings by Taber Abraser. When monitored by percent retention of gloss or retroreflectivity over the abraded surfaces, the cured films of preferred embodiments show excellent abrasion resistance relative to conventional screen printing ink standards.

The radiation cured films of preferred embodiments also exhibit durability in outdoor applications, particularly when used as a system with retroreflective sheeting. Based upon direct comparison, these films exhibit comparable or improved durability relative to conventional screen printing ink standards.

Preferred radiation curable compositions of the present invention generally incorporate (1) a radiation curable component comprising a reactive diluent, optionally one or more macromers, optionally one or more oligomers, and/or optionally one or more polymers, (2) a solvent component, and (3) one or more optional adjuvants that are selected based upon the intended use of the compositions. In the practice of the present invention, "radiation curable" refers to functionality directly or indirectly pendant from a monomer, oligomer, or polymer backbone (as the case may be) that participate in crosslinking reactions upon exposure to a suitable source of curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon—carbon double bonds, allyloxy groups, alpha-methyl styrene groups, (meth) acrylamide groups, cyanate ester groups, vinyl ethers groups, combinations of these, and the like. Free radically polymerizable groups are preferred. Of these, (meth)acryl moieties are most preferred. The term "(meth)acryl", as used herein, encompasses acryl and/or methacryl.

The energy source used for achieving crosslinking of the radiation curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of crosslinking. Additionally, actinic radiation and accelerated particles can be used for curing at relatively low temperatures. This avoids degrading components that might be sensitive to the relatively high temperatures that might be required to initiate crosslinking of the curable groups when using thermal curing techniques. Suitable sources of actinic radiation include mercury lamps, xenon lamps, carbon arc lamps, tungsten filament lamps, lasers, electron beam energy, sunlight, and the like. Ultraviolet radiation, especially from a medium pressure mercury lamp, is most preferred.

As used herein, the term "monomer" means a relatively low molecular weight (i.e., having a molecular weight less than about 500 g/mole) material having one or more polymerizable groups. "Oligomer" means a relatively intermediate molecular weight (i.e., having a molecular weight of from about 500 up to about 100,000 g/mole) material having one or more polymerizable groups. "Polymer" means a molecule having a substructure formed from one or more monomeric and/or oligomeric constituents and that has no further radiation curable group(s). The term "molecular weight" as used throughout this specification means number average molecular weight unless expressly noted otherwise.

As used herein, the term "oligo/resin" shall be used to refer collectively to oligomers and polymers. Preferred oligo/resins have a number average molecular weight below about 100,000, preferably from about 500 to about 30,000, and more preferably from about 700 to about 10,000. One or more oligo/resins may be incorporated into fluid compositions of the present invention in order to provide many benefits, including viscosity control, reduced shrinkage upon curing, durability, flexibility, adhesion to porous and nonporous substrates, outdoor weatherability, and/or the like. Oligo/resins suitable in the practice of the present invention may be polyurethanes, acrylic materials, polyesters, polyimides, polyamides, epoxies, polystyrene, styrene and substituted styrene containing materials, silicone containing materials, fluorinated materials, combinations of these, and the like. Preferred oligo/resin materials are aliphatic in that aliphatic materials tend to have good weatherability properties.

Optionally, one of the radiation curable monomers and/or the oligo/resins of the present invention may include functionality to help enhance the performance of the fluid compositions of the present invention. For example, oligo/resins may include radiation curable functionality to allow these materials to co-crosslink with the reactive diluent upon exposure to a suitable energy source. To allow the oligo/resins to form an interpenetrating polymer network with the reactive diluent, oligo/resins may include a different kind of crosslinking functionality such as pendant hydroxyl groups or the like. In the presence of an isocyanate crosslinking agent, pendant hydroxyl moieties will undergo urethane crosslinking reactions with the NCO groups of the isocyanate crosslinking agent to form a crosslinked network comprising urethane linkages. To help disperse optional additives such as pigment colorants, inorganic powder fillers, and the like, oligo/resins may comprise pendant dispersant moieties, such as acid or salt moieties of sulfonate, phosphate, phosphonate, carboxylate, polar heterocyclic, (meth)acrylonitrile, and/or the like.

For outdoor applications, polyurethane and acrylic-containing oligo/resins are preferred due to the tendency of these materials to have excellent durability and weatherability characteristics. Such materials also tend to be readily soluble in reactive diluents formed from radiation curable, (meth)acrylate functional monomers.

Because aromatic constituents of oligo/resins generally tend to have poor weatherability and/or poor resistance to sunlight, aromatic constituents are preferably limited to less than 5 weight percent, preferably less than 1 weight percent, and more preferably are substantially excluded from both the oligo/resins and the reactive diluents of the present invention. Accordingly, straight-chain, branched and/or cyclic aliphatic and/or heterocyclic ingredients are preferred for forming oligo/resins to be used in outdoor applications.

The oligo/resins themselves may be straight-chain, branched, and/or cyclic. Branched oligo/resins are preferred in that such materials tend to have lower viscosity than straight-chain counterparts of comparable molecular weight. The amount of oligo/resin materials incorporated into fluid compositions of the present invention may vary within a wide range depending upon such factors as the intended use of the resultant composition, the nature of the reactive diluent, the nature to of the oligo/resin(s), the weight average molecular weight of the oligo/resins, and the like. As general guidelines ink jettable fluid compositions may include from about 0.1 to about 50 weight percent of oligo/resins, wherein polymer species preferably may comprise from about 0.1 to about 30, preferably 5 to about 20 weight percent of the composition. Oligomer species may comprise from about 0.1 to about 50, preferably from about 15 to about 40 weight percent of the composition.

Suitable radiation curable oligo/resins for use in the present invention include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Preferred (meth)acrylated aliphatic urethanes are di(meth)acrylate esters of hydroxy terminated isocyanato (—NCO) extended aliphatic polyesters or aliphatic polyethers. (Meth)acrylated polyesters are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.); EBECRYL 284, 810, 4830, 8402, 1290, 1657, 1810, 2001, 2047, 230, 244, 264, 265, 270, 4833, 4835, 4842, 4866, 4883, 657, 770, 80, 81, 811, 812, 83, 830, 8301, 835, 870, 8800, 8803, 8804 (UCB Radcure Inc. of Smyrna, Ga.); SARTOMER CN series CN964 B-85, CN292, CN704, C 816, CN817, CN818, CN929, CN944B-85, CN945A-60, CN945B-85, CN953, CN961, CN962, CN963, CN 965, CN966, CN968, CN980, CN981, CN982, CN983, CN984, CN985 (Sartomer Co. of Exton, Pa.); ACTILANE (Akcross Chemicals of New Brunswick, N.J.); and UVITHANE (Morton International of Chicago, Ill.).

Preferred acrylated acrylics are acrylic oligomers or polymers that have reactive pendant or terminal (meth)acrylic acid groups capable of forming free radicals for subsequent reaction. Examples of commercially available (meth)acrylated acrylics include those known by the trade designations EBECRYL 745, 754, 767, 1701, and 1755 from UCB Radcure Inc., Smyrna, Ga. Other oligo/resin examples include polymers available under the trade designations ELVACITE 2014 (ICI Acrylics, Inc., Wilmington, Del.); JONCRYL 587 (S.C. Johnson, Racine, Wis.); and ACRYLOID B series and PARALOID B series such as PARALOID B-60 (Rohm & Haas Co., Philadelphia, Pa.).

Another particularly preferred class of radiation curable, urethane oligomers are described in Assignee's co-pending U.S. patent application filed concurrently with the present application in the name of James Carlson et al. titled INKS AND OTHER COMPOSITIONS INCORPORATING LOW VISCOSITY, RADIATION CURABLE, POLYESTER URETHANE OLIGOMER, the entire disclosure of which is incorporated herein by reference. These radiation curable, urethane oligomers are generally characterized by atypically low viscosity characteristics, have a relatively high urethane content, are very economical to manufacture, and are compatible with a wide range of porous and nonporous substrates.

The reactive diluent generally comprises one or more radiation curable monomers. Subject to desired performance standards, any radiation curable monomer or combinations thereof may be incorporated into the reactive diluent. Accordingly, the present invention is not intended to be limited to specific kinds of radiation curable monomers in various aspects so long as any such performance conditions are satisfied. However, for ink jetting applications, such monomers, at least in combination, preferably exist as a liquid of ink jettable viscosity at the desired ink jet head temperature.

The radiation curable monomers of the reactive diluent may be mono-, di-, tri-, tetra- or otherwise multifunctional in terms of radiation curable moieties. These monomers function as diluents or solvents for the oligo/resin component (if any), as viscosity reducers, as binders when cured, and as crosslinking agents. The amount of such monomers to be incorporated into the reactive diluent can vary within a wide range depending upon the intended use of the resultant composition. As general guidelines, the radiation curable component of the present invention may contain from about 25 to about 100, preferably 40 to 90 weight percent of such monomers.

Representative examples of monofunctional, radiation curable monomers suitable for use in the reactive diluent include styrene, alpha-methylstyrene, substituted styrene, vinyl esters, vinyl ethers, N-vinyl-2-pyrrolidone, (meth) acrylamide, N-substituted (meth)acrylamide, octyl (meth) acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth) acrylate, lauryl (meth)acrylate, β-carboxyethyl (meth) acrylate, isobutyl (meth)acrylate, cycloaliphatic epoxide, α-epoxide, 2-hydroxyethyl (meth)acrylate, (meth) acrylonitrile, maleic anhydride, itaconic acid, isodecyl (meth)acrylate, dodecyl (meth)acrylate, n-butyl (meth) acrylate, methyl (meth)acrylate, hexyl (meth)acrylate, (meth)acrylic acid, N-vinylcaprolactam, stearyl (meth) acrylate, hydroxy functional caprolactone ester (meth) acrylate, isooctyl (meth)acrylate, hydroxyethyl (meth) acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional radiation curable materials may also be incorporated into the reactive diluent to enhance one or more properties of the cured film, including crosslink density, hardness, mar resistance, or the like. If one or more of such multi functional materials are present, the reactive diluent may comprise from 0.5 to about 50, preferably 0.5 to 35, and more preferably from about 0.5 to about 25 weight percent of such materials. Examples of such higher functional, radiation curable monomers include ethylene glycol di(meth)acrylate, hexanediol di(meth)acrylate, triethylene glycol di(meth)acrylate, tetraethylene glycol di(meth) acrylate, trimethylolpropane tri(meth)acrylate, ethoxylated trimethylolpropane tri(meth)acrylate, glycerol tri(meth) acrylate, pentaerythritol tri(meth)acrylate, pentaerythritol tetra(meth)acrylate, and neopentylglycol di(meth)acrylate, combinations of these, and the like.

Preferred radiation curable, reactive diluents of the present invention may be formulated with one or more radiation curable monomers or combinations thereof that help the radiation curable compositions and/or resultant cured compositions to satisfy one or more desirable performance criteria. For example, in order to promote hardness and abrasion resistance of resultant cured material, fluid compositions of the present invention advantageously may incorporate radiation curable monomer(s) (hereinafter "high Tg component") whose presence causes the cured material, or a portion thereof, to have a higher glass transition temperature, Tg, as compared to an otherwise identical material lacking such high Tg component. Preferred monomeric constituents of the high Tg component generally include monomers whose homopolymer has a Tg of at least about 50° C., preferably at least about 60° C., and more preferably at least about 75° C. When used, the high Tg component may constitute 0.5 to 50, preferably 0.5 to 40, more preferably 0.5 to 30 weight percent of the radiation curable, reactive diluent.

An exemplary class of radiation curable monomers that tend to have relatively high Tg characteristics suitable for incorporation into the high Tg component generally comprise at least one radiation curable (meth)acrylate moiety and at least one alicyclic and/or heterocyclic moiety. Isobornyl (meth)acrylate is a specific example of one such monomer. A a cured, homopolymer film formed from isobornyl acrylate, for instance, has a Tg of 88° C. The monomer itself has a molecular weight of 208 g/mole, exists as a clear liquid at room temperature, has a viscosity of 9 centipoise at 25° C., has a surface tension of 31.7 dynes/cm at 25° C., and is an excellent reactive diluent for many kinds of oligo/resins. In the practice of the present invention, Tg of a monomer refers to the glass transition temperature of a cured film of a homopolymer of the monomer, in which Tg is measured by differential scanning calorimetry (DSC) techniques.

In order to promote adhesion both before and especially after radiation curing, fluid compositions of the present invention advantageously may incorporate radiation curable monomer(s) (hereinafter "adhesion promoting component") whose presence causes the uncured and/or cured material to have higher adhesion to the desired receiving substrate as compared to an otherwise identical formulation lacking such adhesion promoting component. Preferred monomeric constituents of the adhesion promoting component generally include monomers having an adhesion score of at least about 50, preferably at least about 80, and more preferably at least about 95 when measured according to ASTM D 3359-95A Standard Test Methods for Measuring Adhesion by Tape Test, Method B. When used, the adhesion promoting component may comprise 0.5 to about 70, preferably 0.5 to about 50, more preferably 0.5 to about 40 weight percent of the reactive diluent.

A wide variety of monomers with adhesion promoting characteristics may be incorporated singly or in combination into the adhesion promoting component of the reactive diluent. Adhesion promoting monomers are those that tend to diffuse into the substrate to form a physical lock when cured. Such monomers have a measurable diffusion coefficient into the substrate of interest. One such class of monomers comprises one or more (meth)acrylate moieties and one or more alkoxy and/or polyalkoxy moieties. These alkoxylated monomers tend to be characterized by good flexibility, low shrinkage, and impact strength when cured. However, the alkoxy or polyalkoxy moieties of such materials may have a tendency to oxidize over time. This could impair the performance of the resultant cured material, particularly if the alkoxylated functionality is situated in the monomer such that such functionality is positioned as part of a main polymer backbone when the compositions of the present invention are cured. These materials also are compatible only with a limited range of nonporous substrates.

Accordingly, it is preferred to limit the use of alkoxylated monomers comprising such main chaing alkoxylated functionality, and preferred reactive diluents comprise no more than about 30 weight percent of such alkoxylated monomers. Limiting the use of alkoxylated monomers for which the alkoxylated functionality becomes pendant from a main polymer backbone is generally not required in the practice of the present invention. Oxidation of such pendant alkoxylated functionality has less of an impact upon bulk polymer properties than does oxidation of main chain alkoxylated functionality.

A specific example of one illustrative alkoxylated monomer is 2-(2-ethoxyethoxy)ethyl acrylate. This monomer is a clear liquid at room temperature and has a viscosity of 6 centipoise at 25° C., a surface tension of 32.4 dynes/cm at 25° C., and is slightly polar. A homopolymer of this monomer has a Tg of −54° C.

Another class of radiation curable monomers with adhesion promoting characteristics suitable for use in the adhesion promoting component include relatively low Tg monomers comprising at least one heterocyclic moiety and at least one (meth)acrylate moiety. As used herein, low Tg means that a cured homopolymer film of the monomer has a Tg of less than about 40° C., preferably less than about 10° C., and more preferably less than about −10° C. An illustrative embodiment of one such monomer is tetrahydrofurfuryl acrylate. This monomer is an excellent adhesion promoter with respect to many different kinds of porous and nonporous substrates, is a clear liquid at room temperature, has a viscosity of 6 centipoise at 25° C., a surface tension of 36.1 dynes/cm at 25° C., a Tg of −28° C., and a molecular weight of 156 g/mole.

Combinations of monomers with adhesion promoting characteristics are advantageously used to formulate an adhesion promoting component of the present invention. One particularly preferred combination with good adhesion promoting properties comprises 1 to 10 parts by weight of an alkoxylated (meth)acrylate per 5 to 15 parts by weight of a heterocyclic (meth)acrylate. A particularly preferred embodiment of such a combination comprises 2-(2-ethoxyethoxy)ethyl (meth)acrylate and tetrahydrofurfuryl (meth)acrylate.

In many applications, printing features with good initial gloss and good gloss retention over time is important. For such applications, it may be desirable to incorporate one or more monomers (hereinafter gloss component) into the reactive diluent whose presence provides cured, printed features with better initial gloss and or gloss retention as compared to otherwise identical films lacking such gloss component. Preferred radiation curable reactive diluents comprise a sufficient amount of a gloss component such that a cured, homopolymer film of the material has a 60° gloss of at least 70, preferably at least 90, when measured according to ASTM D 523 Standard Test Method for Specular Gloss. When a gloss component is used, reactive diluents may comprise 0.5 to 30, preferably 0.5 to 15, more preferably 0.5 to 10 weight percent of the gloss component.

A wide variety of suitable monomers may be incorporated singly or in combination into the gloss component. One such class of monomers comprises radiation curable monomers that are solids at room temperature. Although solids by themselves, such monomers tend to be readily soluble in one or more of the other monomers constituting the reactive diluent. Thus, these solid, gloss promoting materials are easily included in ink jettable formulations. A specific example of such a monomer is N-vinyl caprolactam. This monomer is a solid up to about 34° C., has a viscosity of 2.88 centipoise at 50° C., and a flash point of 114° C.

In some instances, one or more monomers incorporated into the reactive diluent may have beneficial properties in one regard, yet may have poor wetting characteristics in terms of being able to wet a wide range of different kinds of porous and nonporous substrates. Tetrahydrofurfuryl acrylate is a good example of this. This monomer has excellent adhesive characteristics, but limited wetting characteristics. Accordingly, in such instances if desired, it may be desirable to incorporate one or more monomers (enhanced wetting component) into the reactive diluent whose presence causes the radiation curable fluid composition to have better wetting properties for the desired substrate(s) as compared to an otherwise identical composition lacking such a component. Preferred constituents of the enhanced wetting component preferably comprise one or more monomers respectively having surface tension properties of about 30 dynes/cm or less.

A wide variety of monomers with such low surface tension properties may be incorporated singly or in combination into the enhanced wetting component. One such class of monomers comprises at least one (meth)acrylate moiety and at least one aliphatic moiety that is straight chained or branched. A specific example of this class of monomers is isooctyl acrylate. This monomer is a clear liquid at room temperature, has a molecular weight of 184 g/mole, and has a surface tension of 28 dynes/cm.

There are several representative examples of specific embodiments of radiation curable, reactive diluent formulations of the present invention that advantageously incorporate one or more of the reactive diluent components described above. For example, one such reactive diluent embodiment comprises 10 to 40 weight percent of the high Tg component (preferably isobornyl (meth)acrylate), 15 to 50 weight percent of the adhesion promoting component (preferably a combination of 1 to 20 parts by weight of 2(2-ethoxyethoxy)ethyl (meth)acrylate per 1 to 20 parts by weight of tetrahydrofurfuryl (meth)acrylate), 5 to 10 weight percent of the gloss component (preferably N-vinylcaprolactam), 5 to 20 weight percent of a multifunctional radiation curable monomer (preferably 1,6-hexanediol di(meth)acrylate), and 5 to 20 weight percent of the low surface tension component (preferably isooctyl (meth)acrylate).

Another illustrative, preferred reactive diluent of the present invention comprises 30 to 50 weight percent of a high Tg component (preferably isobornyl (meth)acrylate), 30 to 50 weight percent of a adhesion promoting component (preferably 2-(2-ethoxyethoxy)ethyl (meth)acrylate and/or tetrahydrofurfuryl (meth)acrylate), and 5 to 15 weight percent of a multifunctional radiation curable monomer (preferably 1,6-hexanediol di(meth)acrylate).

Radiation curable ink compositions of the present invention also advantageously incorporate a limited, moderate amount of a solvent component with low surface tension properties. Preferred solvents desirably have a surface tension that is no more than about, and preferably at least about 2 dynes/cm less than, the surface tension of the reactive diluent taken as a whole; provided, however, that the more preferred solvents additionally have a surface tension that is less than about 30 dynes/cm at 25° C., preferably less than about 28 dynes/cm at 25° C., and more preferably less than about 26 dynes/cm at 25° C. The preferred solvents also desirably have a relatively high flash point of at least about 50° C., preferably at least about 60° C.

The compositions desirably include enough solvent to promote the desired level of wetting and adhesion, to reduce the viscosity of the composition to a level suitable for ink jetting applications, to reduce the surface tension of the composition to the necessary level to wet a wide variety of substrates, and/or to provide a vapor barrier that forms over printed compositions in situ during radiation curing to improve the quality of the cure. So long as enough solvent is present to promote one or more of these objectives as desired, using lesser amounts of solvent tends to provide better quality printed features as compared to using greater amounts of solvent. Using more solvent than is needed may also increase the difficulty of drying the printed features during radiation curing and could deteriorate the cured image appearance and properties. As general guidelines, radiation curable ink compositions of the present invention may comprise 0.1 to 40, preferably 0.5 to 15, more preferably 1 to about 10 weight percent of the solvent component.

The solvent component may comprise one or more solvents that may be aqueous or inorganic, polar or nonpolar, or the like. Organic solvents that are polar or nonpolar are more preferred inasmuch as such solvents tend to dry more readily during radiation curing. Preferred organic solvents also promote compatibility with a wide range of polymer substrates by reducing the surface tension of the ink to the desired level. Also, preferred solvents should be compatible with the pigment dispersion so that the solvent does not cause ink instability. As another desirable characteristic, solvents of the present invention are desirably liquids at the print head temperature and undergo substantially no polymerization through free radical polymerization mechanisms when radiation curable components of the formulations are radiation cured.

It can be appreciated, therefore, that a wide range of solvents may be incorporated into the solvent component. Representative examples include water; alcohols such as isopropyl alcohol (IPA) or ethanol; ketones such as methyl ethyl ketone, cyclohexanone, or acetone; aromatic hydrocarbons; isophorone; butyrolactone; N-methyl pyrrolidone; tetrahydrofuran; ethers such as lactates, acetates, and the like; ester solvents such as propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters; combinations of these and the like.

Esters, particularly those comprising branched aliphatic moieties such as iso-alkyl moieties, are one class of preferred solvents. These solvents provide numerous advantages when incorporated into radiation curable ink jet inks. First, these solvents are compatible with all of the nonporous, polymeric substrates currently in widespread use in the sign making industry. The materials are also excellent solvents for the radiation curable monomers, oligomers, and polymers. Uniquely, these materials evaporate very easily, yet have relatively high flash points. Thus, these solvents are easily removed during radiation curing, yet do not significantly reduce the formulation flash point. Ink compositions including these solvents also have very favorable dot gain characteristics. A variety of branched, aliphatic ester solvents are commercially available under the trade designation "EXXATE" from ExxonMobil Corp. of Irving, Tex.

In preferred embodiments, relatively polar solvents such as isopropyl alcohol are less desirable than relatively nonpolar solvents in that polar solvents may have a strong affinity for the dispersants, if any, used to stabilize the pigment in the inks. This affinity can cause pigment agglomeration and ink destabilization. Solvents with static surface tension at 25° C. of greater than about 30 dynes/cm also are less preferred.

In addition to the radiation curable component and the solvent, one or more other additives may be incorporated into compositions of the present invention in accordance with conventional practices. These optional additives include one or more of photoinitiators, colorants, slip modifiers, thixotropic agents, foaming agents, antifoaming agents, flow or other rheology control agents, waxes, oils, plasticizers, binders, antioxidants, photoinitiator stabilizers, electrical conductive agents, fungicides, bactericides, organic and/or inorganic filler particles, leveling agents, opacifiers, antistatic agents, dispersants, and the like.

The pigment used in the ink composition provides the desired color. Durable pigments are preferred for use in the inks of the invention, meaning that they have good outdoor durability and resist fading upon exposure to sun and the elements.

Pigments useful in the invention may be organic or inorganic. Suitable inorganic pigments include carbon black and titania ($TiO_2$), while suitable organic pigments include phthalocyanines, anthraquinones, perylenes, carbazoles, monoazo- and disazobenzimidazolone, isoindolinones, monoazonaphthol, diarylidepyrazolone, rhodamine, indigoid, quinacridone, diazopyranthrone, dinitraniline, pyrazolone, dianisidine, pyranthrone, tetrachloroisoindolinone, dioxazine, monoazoacrylide, anthrapyrimidine. It will be recognized by those skilled in the art that organic pigments will be differently shaded, or even have different colors, depending on the functional groups attached to the main molecule.

Commercial examples of useful organic pigments include those known described in The Colour Index, Vols. 1–8, Society of Dyers and Colourists, Yorkshire, England having the designations Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60 (blue pigments); Pigment Brown 5, Pigment Brown 23, and Pigment Brown 25 (brown pigments); Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, and Pigment Yellow 175 (yellow pigments); Pigment Green 1, Pigment Green 7, Pigment Green 10, and Pigment Green 36 (green pigments); Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61 (orange pigments); Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224 (red pigments); Pigment Violet 19, Pigment Violet 23, Pigment Violet 37, Pigment Violet 32, and Pigment Violet 42 (violet pigments); and Pigment Black 6 or 7(black pigments).

The pigment is generally incorporated into the ink composition by milling the pigment into selected reactive monomers and optional oligo/resin materials. If the ink is to be used in applications wherein the ink is used in combination with a retroreflective backing, the pigment must be milled to a particle size that provides sufficient transparency to permit retroreflection and provide retroreflective color. This may be accomplished, for example, by milling the pigment.

If a colorant in the form of pigment is used, a dispersant may be desired in some instances in order to stabilize the pigment. The choice of dispersant depends on factors such as the type of pigment used, the type of oligo/resin(s) in the formulation, the composition of the phase(s) into which the pigment will be dispersed, and the like. Examples of commercially available dispersants suitable for this application include those sold under the trade designations SOLSPERSE from Zeneca of Wilmington, Del.; EFKA from Lubrizol Corp. of Wickliff, Ohio; and BYK from BYK-Chemie USA of Wallingford, Conn.

It is possible to use mixtures of dispersants also. The amount of dispersant added depends on the type and concentration of the pigment. Typically 20 to 100 parts by weight of dispersant are used per 100 parts by weight of organic pigment, and between 5 to 80 parts by weight of the dispersant per 100 parts by weight inorganic pigment.

In the preferred mode of the invention, the inks are cured using UV radiation, which typically benefits from the presence of at least one photoinitiator. The type of photoinitiator used depends on the choice of colorant in the ink and on the wavelength of the radiation. Commercially available free-radical generating photoinitiators suitable for the invention include, but are not limited to benzophenone, benzoin ether and acylphosphine photoinitiators such as those sold under the trade designations IRGACURE and DAROCUR from Ciba-Geigy Corp. of Ardsey, N.Y.

In addition, the colorant in the ink will absorb part of the incident radiation, depleting the available energy to activate the photoinitiator(s). This will slow down the curing rate and may result in poor through and/or surface cure of the applied ink. It is therefore preferred to use a mixture of photoinitiators in order to provide both surface and through cure. The amount of photoinitiator(s) used typically varies between 1 and 15 weight percent and preferably between 3 and 12 weight percent and more preferably between 5 and 10 weight percent for formulations containing colorant. The uncolored inks can have lower initiator concentrations. Co-initiators and amine synergists can be included in order to improve curing rate. Examples include isopropylthioxanthone, ethyl 4-(dimethylamino)benzoate, 2-ethylhexyl dimethylaminobenzoate, and dimethylaminoethyl methacrylate.

To enhance durability of a printed image graphic, especially in outdoor environments exposed to sunlight, a variety of commercially available stabilizing chemicals can be added optionally to inks of the present invention. These stabilizers can be grouped into the following categories: heat stabilizers; ultra-violet light stabilizers; and free-radical scavengers. Heat stabilizers are commonly used to protect the resulting image graphic against the effects of heat and are commercially available under the trade designations MARK V 1923 (Witco Corp. of Greenwich, Conn.); SYNPRON 1163, Ferro 1237 and Ferro 1720 (Ferro Corp., Polymer Additives Div., Walton Hills, Ohio). Such heat stabilizers can be present in amounts ranging from about 0.02 to about 0.15 weight percent.

Ultraviolet light stabilizers are commercially available under the trade designations UVINOL 400 (a benzophenone type uv-absorber sold by BASF Corp. of Parsippany, N.J.); Cyasorba UV164 from Cytec Industries, West Patterson, N.J.; and TINUVIN 900 and/or 1130 UV-absorber (Ciba Specialty Chemicals, Tarrytown, N.Y.) and can be present in amounts ranging from about 0.1 to about 5 weight percent of the total ink.

Free-radical scavengers can be present in an amount from about 0.05 to about 2.5 weight percent of the total ink. Nonlimiting examples of the scavenger include hindered amine light stabilizer (HALS) compounds, hydroxylamines, sterically hindered phenols, and the like.

Commercially available HALS compounds include TINUVIN 292 (trade designation for a hindered amine light stabilizer sold by Ciba Specialty Chemicals, Tarrytown, N.Y.) and CYASORB UV3581 (trade designation for a hindered amine light stabilizer sold by Cytec Industries, West Patterson, N.J.).

Optionally, the composition may include one or more additives in order to adjust the electrical conductivity of the composition. For example, as one suggested range that may be preferred for some applications, the electrical conductivity of the composition may be adjusted such that the electrical resistivity is below 5000 ohm-cm, preferably below about 500 ohm-cm. In accordance with the present invention, an ink shall be deemed to be conductive if it has an electrical resistivity in this range. If outside this range, such an ink will be deemed to be substantially nonconductive. If present, conductive agents are typically present in amounts up to about 2 weight percent. Examples include dimethylamine hydrochloride, diethylamine hydrochloride, lithium nitrate, and hydroxylamine hydrochloride.

In some applications, such as certain forms of ink jet printing, substantially nonconductive inks are required for good performance. For such applications, ink compositions of the present invention preferably are substantially nonconductive.

The compositions of the present invention are made by mixing together the desired ingredients using any suitable technique. For example, in a one step approach, all of the ingredients are combined and blended, stirred, milled, or otherwise mixed to form a homogeneous composition. As another alternative, at least some of the components of the radiation curable component and at least some of the solvent may be blended together in a first step. Then, in one or more additional steps, the remaining solvent if any, the remaining constituents of the radiation curable component if any, and one or more additives may be incorporated into the composition via blending, milling, or other mixing technique.

As still yet another approach which is particularly preferred when pigment colorants are to be included in the radiation curable, fluid compositions, a preferred processing approach involves preparing the composition such that the pigment particle size of the colorant is less than 5 micrometers, preferably less than 1 micron, ideally less than 0.5 micrometers. The particle size of the pigment colorant may be characterized by an appropriate method such as dynamic light scattering (DLS) or microscopy. We have found that ink jettable compositions comprising such fine pigment colorants provide excellent color saturation, transparency, and jettability, especially for applications in which the composition is a colored ink that is printed onto retroreflective signage of outdoor signage.

Initially, a dispersion is prepared containing from about 1 to about 80 weight percent of the pigment colorant with the balance being the oligo/resin, reactive diluent, and other additives, if desired. At this stage, the pigment may be incorporated into the dispersion as supplied by the vendor. Subsequent milling will reduce the pigment size to the desired fine particle size. This initial dispersion may be prepared by first predissolving a dispersant in the liquid components and then adding the desired amount of pigment powder. Initial wetting of pigment is accomplished with high shear mixing. Next, the dispersion is subjected to high energy milling techniques such as ball milling, sand milling, horizontal media milling, attritor milling, or 2- or 3-roll milling, or the like in order to reduce the pigment to the desired particle size. Following the milling, the resultant ink dispersion is exceptionally stable (i.e. the dispersion remains homogeneous and particle size does not increase over long periods of time, e.g., 26 weeks). Following the milling procedure, the pigment dispersion may be diluted with additional solvents, monomers, oligomers, polymers, dispersants, flow agents, surfactants, photoinitiators, UVA, HALS, and/or the like. The millbase also remains stable following the addition and incorporation of these additional components. Detailed teaching of pigment milling and millbase let down can be found in Patton, "Paint Flow and Pigment Dispersion", ISBN #0-471-03272.

The compositions of the present invention may be applied in any suitable fashion onto a receiving substrate such as wood, metal, paper, woven or nonwoven fabrics, resin-coated paper, foil, polymer articles, polymer films, and the like. Representative examples of coating techniques include screen printing, spraying, ink jetting, extrusion-die coating, flexographic printing, offset printing, gravure coating, knife coating, brushing, curtain coating, wire-wound rod coating, bar coating and the like. The compositions of the present invention may be used to form graphic elements, text items, continuous layers, bar codes, or other features.

Compositions of the present invention are highly compatible with both porous and nonporous substrates. The compatibility with nonporous materials allows these compositions to be applied onto a wide range of nonporous polymer films. Nonlimiting examples of such films include single and multi-layer constructions of acrylic-containing films, poly(vinyl chloride)-containing films, (e.g., vinyl, plasticized vinyl, reinforced vinyl, vinyl/acrylic blends), urethane-containing films, melamine-containing films, polyvinylbutyral-containing films, and multi-layered films having an image reception layer comprising an acid- or acid/acrylate modified ethylene vinyl acetate resin, as disclosed in U.S. Pat. No. 5,721,086 (Emslander et al.) or having an image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

Such films have two major surfaces with one surface being able to receive an inkjet image graphic of the present invention and the other major surface being adhered to a field of pressure sensitive adhesive. Usually, the field of adhesive on one major surface is protected by a release liner. Such films can be clear, translucent, or opaque. Such films can be colorless or solid color or a pattern of colors. Such films can be transmissive, reflective, or retroreflective.

Commercially available films known to those skilled in the art include the multitude of films available from 3M Company under the trade designations PANAFLEX, NOMAD, SCOTCHCAL, SCOTCHLITE, CONTROLTAC, and CONTROLTAC-PLUS.

After being coated, the compositions may be cured using a suitable fluence and type of curing energy. The amount of curing energy to be used for curing depends upon a number of factors, such as the amount and the type of reactants involved, the energy source, web speed, the distance from the energy source, and the thickness of the material to be cured. Generally, the rate of curing tends to increase with increased energy intensity. The rate of curing also may tend to increase with increasing amounts of photocatalyst and/or photoinitiator being present in the composition. As general guidelines, actinic radiation typically involves a total energy exposure from about 0.1 to about 10 $J/cm^2$, and electron beam radiation typically involves a total energy exposure in the range from less than 1 megarad to 100 megarads or more, preferably 1 to 10 Mrads. Exposure times may be from less than about 1 second up to 10 minutes or more. Radiation exposure may occur in air or in an inert atmosphere such as nitrogen.

The present invention will now be further described with reference to the following illustrative examples.

Test Methods Used in the Examples

Viscosity was measured either using a Brookfield viscometer or by using a Rheometrics SR-200 (Rheometric Scientific, Inc. of Piscataway, N.J.) controlled stress rheometer with the cup and bob geometry. The viscosity dependence on shear rate and temperature was recorded. For shear thinning samples, it was assumed that the viscosity as measured at $1000 \text{ s}^{-1}$ was the same as the viscosity during jetting.

The power law index was calculated from measurement of the shear thinning behavior of the sample.

Static surface tension was measured at room temperature using a Kruss K-12 processor tensiometer (available from Kruss GmbH of Hamburg Germany) using the plate method.

Percent elongation of cured films was determined according to ASTM Test Method D-5035

Contact angle measurements (advancing) were carried out using a goniometer from Rame-Hart, Inc. of Mountain Lakes, N.J.

Wetting and flow rating were judged by eye. A rating of 0 indicated perfect wetting and flow at one end of the scale, while a rating of 3 indicated very poor wetting and flow at the other end of the scale.

Adhesion was measured by crosshatch method according to ASTM D 3359-95A Standard Test Methods for Measuring Adhesion by Tape Test, Method B.

The Following Abbreviations are used Throughout the Examples:

| | |
|---|---|
| cP | centipoise; |
| THFFA | tetrahydrofurfuryl acrylate; |
| IBOA | isobornyl acrylate; |
| EEEA | 2-(2-ethoxyethoxy)ethyl acrylate; |
| HDDA | hexanediol diacrylate; |
| IOA | isooctyl acrylate; |
| NVC | N-vinylcaprolactam; |
| Diamond Grade | 3M SCOTCHLITE DIAMOND GRADE LDP REFLECTIVE SHEETING SERIES 3970 retroreflective film available from 3M Company; |
| 3540C film | 3M CONTROLTAC PLUS GRAPHIC MARKING FILM WITH COMPLY ™ PERFORMANCE 3540C (SCREEN PRINTING) available from 3M Company; |
| 180-10 vinyl | 3M CONTROLTAC PLUS GRAPHIC SYSTEM 180-10 vinyl film available from 3M Company; |
| SF96-100 | SILICONE SF96-100, a trade designation for a silicone flow agent available from General Electric Corp. of Schenectady, NY; |
| IPTX | isopropylthioxanthone commercially available under the trade designation SPEEDCURE ITX from Aceto Corp. of New Hyde Park, NY. |

The Following Additional Materials were used in the Examples:

Oligomer A was prepared according to the following procedure: 60 g polycaprolactone acrylate (molecular weight 344, 0.174 equivalents, Aldrich Chemical Co. of Milwaukee, Wis.) was added to 200 mg BHT and 1 drop dibutyltin dilaurate. This was heated under an atmosphere of dry air to 45° C. 24 g VESTANAT TMDI (trade designation for a mixture of 2,2,4-trimethyl hexamethylene diisocyanate and 2,4,4-trimethylhexamethylene diisocyanate, 0.236 equivalents, available from Creanova Inc. of Somerset, N.J.) was added slowly, controlling the exotherm to under 55° C. After a 2 hour hold at 50° C, 11.1 g TONE 0305 polycaprolactone triol having 550 molecular weight available from Union Carbide Corp. of Danbury, Conn., (0.062 equivalents) was added along with 2 drops dibutyltin dilaurate. The reaction was held at 50° C. for 48 hours, adding 2 drops of dibutyltin dilaurate at the 24 hour mark. After this, the infrared spectrum showed a small amount of residual isocyanate which was consumed by adding 1 g ethanol and holding for 2 hours. The Brookfield viscosity of the product was determined to be 9000 cp at 25° C. Calculated molecular weight data: M=1250, $M_w$=2100. Gel permeation chromatography results: $M_n$=1380, $M_w$=2480.

Oligomer B was prepared according to the following procedure: 281.3 g TONE M-100 polycaprolactone acrylate, available from Union Carbide Corp. of Danbury, Conn., (0.818 equivalents) was added to 0.040 g 2,6-di-tert-butyl-4-methyl phenol (BHT) and 1 drop dibutyltin dilaurate (both available from Aldrich Chemical Co. of Milwaukee, Wis.). This was heated with stirring under an atmosphere of dry air to 90° C. 84.2 g VESTANAT TMDI (trade designation for a mixture of 2,2,4-trimethyl hexamethylene diisocyanate and 2,4,4-trimethylhexamethylene diisocyanate, 0.80 equivalents, available from Creanova Inc. of Somerset, N.J.) was added slowly, controlling the exotherm to under 100° C. with a water bath. The reaction was held at 90° C. for 8 hours, whereupon the IR spectrum showed no residual isocyanate. The Brookfield viscosity of the product was determined to be 2500 cp at 25° C. The calculated molecular weight of this material was 875.

BAYER YELLOW Y5688 is a trade designation for a yellow pigment available from Bayer Corp. of Pittsburgh, Pa.

RT-343-D magenta pigment is a trade designation for magenta pigment available from Ciba Specialty Chemicals of Tarrytown, N.Y.

249–1284 Cyan 15:3 Pigment is a trade desgniation for cyan pigment available from Sun Chemical Corp. of Fort lee, N.J.

LAMPBLACK LB 101 PIGMENT I is a trade designation for black pigment available from Pfizer Inc. of New York, N.Y.

STABAXOL I is a trade designation for 2,2', 6,6'-tetraisopropyldiphenyl carbodiimide available from Rhein Chemie Corp. of Trenton, N.J.

IRGACURE 819 is a trade designation for bis(2,4,6-trimethylbenzoyl)phenylphosphine oxide, IRGACURE 651 is a trade designation for 2,2-dimethoxy-1,2-diphenylethan-1-one, and IRGACURE 369 is a trade designation for 2-benzyl-2-dimethylamino-1-(4-morpholinophenyl)butan-1-one all are photoinitiators available from Ciba Specialty Chemicals of Tarrytown, N.Y.

SOLSPERSE 5000 and SOLSPERSE 32000 are trade designations for dispersants available from Zeneca Inc of Wilmington, Del.

SR368 is a trade designation for tris (2-hydroxy ethyl) isocyanurate triacrylate, and PRO-4303 is a trade designation for a mixture of 10 weight percent THFFA, 16 weight percent SR368, and 74 weight percent of CN983, an aliphatic polyester based urethane diacrylate, both available from Sartomer Co. of Exton, Pa.

EBECRYL 284 is a trade designation for aliphatic urethane diacrylate diluted 12% with hexanediol diacrylate available from UCB Chemicals of Smyrna, Ga.

Tetrahydrofurfuryl acrylate, isobomyl acrylate, 2-(2-ethoxyethoxy)ethyl acrylate, hexanediol diacrylate, isooctyl acrylate and N-vinylcaprolactam are available from Sartomer Co. of Exton, Pa.

IRGANOX 1035 and TINUVIN 292 are trade designations for stabilizers available from Ciba Specialty Chemicals of Tarrytown, N.Y.

P-M ACETATE is a trade designation for propylene glycol monomethyl ether acetate available from Eastman Chemical Co. of Kingsport, Tenn.

MINI-ZETA is a trade designation for a bead mill available from mill Netzsch Inc. of Exton, Pa.

XAAR XJ128-200 and XAAR XJ128-360 printheads were obtained from Xaar Limited of Cambridge, England.

PIXEL JET is a trade designation for a 64 channel inkjet printhead available from Trident International of Brookfield, Conn.

EXAMPLE 1

This example describes the preparation of yellow, UV curable inks (Ink A1, comparative and Ink B1 of the present invention).

A yellow millbase (Millbase A) was prepared by milling 40 parts Bayer yellow Y5688, 25 parts Solsperse 32000 and 35 parts THFFA for 70 minutes using a Netzsch Mini-Zeta bead mill with 0.5 mm zirconia media.

Ink A1 (comparative) was prepared by combining the following ingredients: 20 parts yellow Millbase A, 100 parts Oligomer A, 40 parts NVC, 75 parts THFFA, 75 parts IBOA and 75 parts EEEA. These were mixed on rollers for 24 hrs.

Ink B1 was prepared by combining with mixing 120 parts ink A1 and 10 parts PM ACETATE (surface tension was 27.4 dyne/cm at 25° C.). The solvent content of Ink B1 was 7.7 percent by weight.

Surface tension and viscosity of the two inks are shown in Table 1.

TABLE 1

| Property | Ink A1 (comparative) | Ink B1 |
|---|---|---|
| Viscosity (cP) | 27.6 | 19.1 |
| Surface tension (dynes/cm) | 33.6 | 32.6 |

Jetting performance of both inks was evaluated using an a XAAR XJ128-200 piezo ink jet printhead. Ink A1 had an average drop velocity of 3.35 m/s while ink B1 had an average drop velocity of 4.0 m/s. Since jetting was at room temperature, and since Ink A1 had a higher viscosity than Ink B1, this result was expected.

To eliminate the effect of viscosity on jetting performance a Trident Pixel jet printhead was used. This printhead can be heated so that the two inks may be jetted at the same viscosity. Ink A1 was jetted at 45.2° C. and Ink B1 was jetted at 37.3° C. At these temperatures, both inks had a viscosity of 12 cP. When jetting performance was examined at these temperatures, both inks performed similarly in terms of the drop velocity and satellite drop formation. The results indicate that added solvent does not have negative effect on jetting performance, and for room temperature jetting, it improves jetting performance by lowering the viscosity.

EXAMPLE 2

This example shows that added solvent improves cured film hardness and mar resistance.

Photoinitiator was added to both Ink A1 and Ink B1 according to the following 20 formulations:

100 parts Ink A1, 3 parts IRGACURE 819, 2 parts IRGACURE 651, 1 parts IPTX, 0.5 parts IRGACURE 369 (Ink A2, comparative).

100 parts Ink B1, 3 parts IRGACURE 819, 2 parts IRGACURE 651, 1 parts IPTX, 0.5 parts IRGACURE 369 (Ink B2).

The inks were printed on an x-y positionable platen using an XAAR XJ128-200 printhead at 200×300 dpi resolution solid fill image on 180–10 vinyl film. Ink A2 printed poorly, and a few nozzles stopped firing during printing. In contrast, Ink B2 printed very well giving a uniform glossy image The printed films were cured using a Fusion UV Systems processor (medium pressure mercury bulbs, Rockville, Md.) at 240 mJ/cm$^2$ exposure. Both samples cured at one pass. Ink B2 gave a harder surface with better mar resistance than Ink A2. Mar resistance was evaluated by running a wooden stick along the film surface while applying pressure, and the mar resistance is qualitatively evaluated by the severity of the mark left by the stick.

EXAMPLE 3

Ink C (comparative) was prepared by combining with mixing: 20 parts Millbase A, 30 parts Oligomer B, 33 parts THFFA, 30 parts IBOA, 30 parts EEEA, 20 parts NVC, 10 parts HDDA, 4 parts TINUVIN 292, 1.8 parts STABAXOL I, 0.2 parts IRGANOX 1035, 12 parts IRGACURE 819, 4 parts IRGACURE 651, 4 parts IRGACURE 369 and 2 parts IPTX Ink D was prepared by combining with mixing: 18 parts Ink C and 2 parts ethyl acetate (surface tension was 23.1 dyne/cm at 25° C.). Ink D had a solvent content of 10 weight percent.

Surface tension and viscosity of the two inks are shown in Table 2.

TABLE 2

| Property | Ink C (comparative) | Ink D |
|---|---|---|
| Viscosity (cP) | 17.5 | 8.8 |
| Surface tension (dynes/cm) | 34.1 | 32.0 |

The inks were printed on an x-y positionable platen using an XAAR XJ128-360 printhead at 317×285 dpi resolution solid fill image on 3540C polyolefin film, 180–10 vinyl film and diamond grade retroreflective film. Printed films were cured as described in Example 1. Adhesion, dot gain, and image quality (wetting) were evaluated and the results are shown below in Table 3.

TABLE 3

| Substrate | Ink C Adhesion | Ink C Dot diameter | Ink C Wetting | Ink D Adhesion | Ink D Dot diameter | Ink D Wetting |
|---|---|---|---|---|---|---|
| 3540C film | 100% | 62 microns | 3 | 100% | 85 microns | 3 |
| 180–10 vinyl film | 100% | 98 microns | 3 | 100% | 123 microns | 2 |
| Diamond Grade | 90% | 150 microns | 1 | 100% | 185 microns | 0 |

The results indicate that samples containing limited amounts of solvent show improved wetting and image quality in general, and better flow of the ink dots. Added solvent improves adhesion to diamond grade film.

EXAMPLE 4

This example describes the preparation of a magenta, UV curable inks.

A magenta millbase (Millbase B) was prepared by milling 33 parts RT-343-D magenta pigment, 11.55 parts SOLSPERSE 32000, and 55.45 parts THFFA for 90 minutes using a Netzsch Mini-Zeta bead mill with 0.5 mm zirconia media.

Ink E was prepared by combining with mixing: 20 parts Millbase B, 4 parts SR368, 5 parts PRO-4303, 5 parts EBECRYL 284, 1 part THFFA, 9 parts EEEA, 6 parts IBOA, 24.5 parts IOA, 5 parts HDDA, 5 parts NVC, 2 parts TINUVIN 292, 0.9 parts STABAXOL I, 6 parts IRGACURE 819, 3 parts IRGACURE 651, 2.5 parts IRGACURE 369 and 1 part IPTX.

Ink F was prepared by combining with mixing 18 parts Ink E and 2 parts ethyl ACETATE. The solvent content of Ink F was 10 percent by weight.

Ink G was prepared by combining with mixing 19.99 parts Ink E and 0.01 parts SF96-100 silicone flow agent.

Surface tension and contact angle of Inks E, F and G are shown in Table 4.

TABLE 4

| | Surface tension (dynes/cm) | Contact angle with 180-10 vinyl film (degrees) | Contact angle with 3540C film (degrees) |
|---|---|---|---|
| Ink E | 30.8 | 11.1 | 17.7 |
| Ink F | 29.2 | 9.6 | 15.7 |
| Ink G | 23.1 | 9.3 | 12.0 |

Adding 10% solvent resulted in a small change in surface tension, but significant reduction in contact angle, while adding flow agent decreased the contact angle, but also resulted in too large decrease in surface tension, which is not desirable since piezo inks with surface tension below about 26 dynes/cm result in nozzle plate flooding during jetting from some printheads, leading to reduced ink reliability. Reduced contact angle allows increased dot gain and improved image quality.

EXAMPLE 5

A black millbase (Millbase C) was prepared by milling 25 parts Lampblack LB-1011 pigment, 5 parts Solsperse 32000 and 70 parts THFFA for 45 minutes using a Netzsch Mini-Zeta bead mill with 0.5 mm zirconia media.

Ink H was prepared by combining with mixing: 10 parts Millbase C, 5 parts SR368, 5 parts PRO-4303, 10 parts EBECRYL 284, 2 parts THFFA, 13.1 parts EEEA, 7 parts IBOA, 23 parts IOA, 5 parts HDDA, 5 parts NVC, 2 parts TINUVIN 292, 0.9 parts STABAXOL I, 5 parts IRGACURE 819, 3 parts IRGACURE 651, 3 parts IRGACURE 369 and 1 part IPTX.

Ink I was prepared by combining with mixing 41.2 parts Ink H, 5 parts of ethyl acetate and 3.8 parts of EBECRYL 284.

Ink J was prepared by combining with mixing 19.99 parts ink H and 0.01 parts SF96-100 silicone flow agent.

Table 5 shows the surface tension and viscosity of the three inks.

TABLE 5

|  | Surface tension (dynes/cm) | Viscosity (centipoise) |
|---|---|---|
| Ink H | 30.8 | 16.6 |
| Ink I | 29.4 | 16.1 |
| Ink J | 23.4 | 16.5 |

Inks H, I, and J were jetted onto Diamond Grade film in a solid block pattern using a XAAR XJ128-200 printhead at 317×295 dpi resolution. They were cured in air using a Fusion UV Systems UV processor with medium pressure mercury lamp at 240 mJ/cm$^2$ exposure. Cure quality was measured by rubbing the film with cotton tip applicator and mar resistance was measured by rubbing the film with a wooden applicator. Qualitatively, cure and mar were evaluated on a scale from 1 to 5 where 1 indicates poor quality, and 5 best quality. Results are shown in Table 6.

TABLE 6

|  | Cure Rating | Mar Resistance Rating |
|---|---|---|
| Ink H | 4 | 1 |
| Ink I | 4.5 | 4 |
| Ink J | 4 | 1 |

EXAMPLE 6

A cyan millbase (Millbase D) was prepared by milling 29.7 parts 249–1284 Cyan 15:3 Pigment, 3.3 parts SOLSPERSE 5000, 13.2 parts SOLSPERSE 32000, and 53.8 parts THFFA for 45 minutes using a Netzsch Mini-Zeta bead mill with 0.5 mm zirconia media.

A series of cyan inks were prepared using Millbase D using the procedure of Example 1, but using formulation amounts as indicated in Table 7. Ink K is a comparative example.

TABLE 7

| Component/Property | Ink K | Ink L | Ink M | Ink N | Ink O | Ink P | Ink Q | Ink R | Ink S | Ink T |
|---|---|---|---|---|---|---|---|---|---|---|
| MILLBASE D | 38 | 9.55 | 9.51 | 9.51 | 9.51 | 9.5 | 9.53 | 9.5 | 9.55 | 9.51 |
| OLIGOMER B | 52.35 | 13.03 | 13.04 | 13 | 13 | 13 | 13.01 | 17.05 | 20 | 25.09 |
| THFFA | 66 | 11.52 | 11.52 | 11.5 | 11.53 | 11.5 | 11.51 | 9.5 | 9.1 | 5.1 |
| EEEA | 60.1 | 15 | 15.01 | 15.01 | 11.01 | 11.05 | 11.06 | 10 | 7.99 | 6 |
| IBOA | 60.05 | 15 | 15 | 15.04 | 13.99 | 13.99 | 14 | 10.02 | 9 | 6 |
| IOA | 8 |  |  |  |  |  |  |  |  |  |
| NVC | 40.01 | 10.04 | 10 | 10.01 | 10.11 | 10 | 10 | 10 | 8 | 8.05 |
| HDDA | 20 | 5.01 | 5.02 | 5.01 | 5.01 | 5 | 5 | 5 | 4 | 4 |
| TINUVIN 292 | 8.01 | 2.01 | 2.01 | 2 | 2.01 | 2 | 2.02 | 2.01 | 1.61 | 1.6 |
| STABAXOL I | 3.61 | 0.9 | 0.91 | 0.9 | 0.93 | 0.9 | 0.91 | 0.9 | 0.9 | 0.9 |
| IRGANOX 1035 | 0.42 | 0.12 | 0.1 | 0.1 | 0.12 | 0.1 | 0.1 | 0.11 | 0.1 | 0.1 |
| IRGACURE 819 | 24.02 | 6.01 | 6 | 6.01 | 6 | 6.01 | 6 | 6.01 | 4.81 | 4.8 |
| IRGACURE 651 | 8 | 2.01 | 2.01 | 2 | 2 | 2 | 2 | 2.01 | 1.61 | 1.6 |
| IRGACURE 369 | 8.02 | 2.01 | 1 | 1.01 | 2 | 2.01 | 2.02 | 2 | 1.6 | 1.6 |
| IPTX | 4.03 | 1 | 1.02 | 1 | 1 | 1 | 1 | 1.01 | 0.8 | 0.8 |
| EXXATE 800 |  |  | 5 |  |  | 10 |  |  |  |  |
| EXXATE 700 |  |  |  |  | 5.01 |  |  | 10.01 |  |  |
| EXXATE 600 |  | 5 |  |  | 10 |  |  | 15 | 20 | 25.01 |
| Viscosity (cP) | 14.7 | 14.18 | 14.09 | 14.09 | 11.38 | 13.38 | 12.91 | 14.55 | 13.1 | 15.46 |
| Reflective Optical Density | 2.1 | 2.15 | 2.13 | 2.13 | 2.16 | 2.14 | 2.23 | 2.17 | 2.18 | 2.18 |
| Flash Point (° C.) | ~208 | 188 | 201 | 192 | 172 | 192 | 184 | 159 | 152 | 146 |
| Surface Tension (Dyne/cm2) | 32.5 | 31.7 | 32.5 | 32.2 | 31.3 | 32 | 32.1 | 30.8 | 30.3 | 30 |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making an ink jettable fluid composition, comprising the steps of:

(a) selecting a solvent component to incorporate into the composition, wherein the solvent component comprises solvent having a surface tension and wherein said solvent is selected for incorporation into the composition from information comprising a solvent characteristic indicative of the solvent surface tension; and (b) incorporating from about 1 to about 15 weight percent of the solvent into a composition comprising said solvent, one or more oligo/resins, and a radiation curable, reactive diluent having a surface tension, wherein the surface tension of the solvent is no more than about the surface tension of the radiation curable reactive diluent.

2. The method of claim 1, wherein the surface tension of the solvent is less than about 30 dynes/cm.

3. The method of claim 1, wherein the surface tension of the solvent is at least 2 dynes/cm less than the surface tension of the radiation curable reactive diluent.

4. The method of claim 1, wherein the solvent is nonpolar.

5. The method of claim 1, wherein the composition is substantially nonconductive.

6. The method of claim 1, wherein the composition is at least substantially free of flow control agents comprising silicone and/or fluorinated moieties.

7. The method of claim 1, wherein the solvent is an acetate ester.

8. The method of claim 1, wherein the solvent has a flash point of at least 50° C.

9. The method of claim 1, wherein the composition comprises 1 to 10 weight percent of the solvent.

10. The method of claim 1, wherein the solvent is an ester comprising a branched aliphatic moiety including 4 to 20 carbon atoms.

11. The method of claim 10, wherein the branched aliphatic moiety is an isoalkyl moiety.

12. The method of claim 1, wherein the solvent is at least substantially free of radiation curable moieties.

* * * * *

UNITED STATES PATENT AND TRADEMARK OFFICE
CERTIFICATE OF CORRECTION

PATENT NO. : 6,730,714 B2
DATED : May 4, 2004
INVENTOR(S) : Ylitalo, Caroline M.

It is certified that error appears in the above-identified patent and that said Letters Patent is hereby corrected as shown below:

Column 6,
Line 66, after "$s^{-1}$" insert -- , --.

Column 10,
Line 61, after "OLIGOMER" insert -- and bearing Attorney Docket No. 55323USA5A --.

Column 21,
Line 24, delete "M=1250" and insert in place thereof -- $M_n$=1250 --.

Column 22,
Line 13, delete "isobomyl" and insert in place thereof -- isobornyl --.

Column 23,
Line 14, after "following" delete "20".

Signed and Sealed this

Thirtieth Day of November, 2004

JON W. DUDAS
*Director of the United States Patent and Trademark Office*